(12) United States Patent
Lai et al.

(10) Patent No.: US 7,911,187 B2
(45) Date of Patent: Mar. 22, 2011

(54) ENERGY STORAGE SYSTEM

(75) Inventors: James Chyi Lai, Saint Paul, MN (US); Kai Chun Fong, Saint Paul, MN (US)

(73) Assignee: Northern Lights Semiconductor Corp., St. Paul, MN (US)

( * ) Notice: Subject to any disclaimer, the term of this patent is extended or adjusted under 35 U.S.C. 154(b) by 141 days.

(21) Appl. No.: 12/116,297

(22) Filed: May 7, 2008

(65) Prior Publication Data

US 2009/0278498 A1 Nov. 12, 2009

(51) Int. Cl.
*H02J 7/00* (2006.01)
(52) U.S. Cl. .............................. 320/167; 307/22; 307/26
(58) Field of Classification Search .................. 320/167, 320/125, 124; 307/22, 26
See application file for complete search history.

(56) References Cited

U.S. PATENT DOCUMENTS

| | | | | |
|---|---|---|---|---|
| 5,162,720 A * | 11/1992 | Lambert | ........................ | 320/104 |
| 5,959,368 A * | 9/1999 | Kubo et al. | ..................... | 307/18 |
| 6,355,990 B1 * | 3/2002 | Mitchell | ......................... | 307/64 |
| 6,531,791 B2 * | 3/2003 | Ekelund et al. | .................. | 307/66 |
| 6,737,756 B1 * | 5/2004 | Gale et al. | .......................... | 290/7 |
| 7,560,829 B2 * | 7/2009 | Proefrock et al. | .............. | 307/18 |
| 7,610,498 B2 * | 10/2009 | Sutardja | ........................ | 713/320 |
| 2006/0271701 A1 * | 11/2006 | Sutardja | ........................ | 709/238 |

* cited by examiner

*Primary Examiner* — Edward Tso
*Assistant Examiner* — Ramy Ramadan
(74) *Attorney, Agent, or Firm* — Thomas, Kayden, Horstemeyer & Risley, LLP

(57) ABSTRACT

An energy storage system includes a battery charger and energy storage devices. The battery charger is connected to a DC/AC current source. The energy storage devices are coupled between the battery charger and subsystems respectively. Each of the energy storage devices includes a magnetic capacitor (MCAP) and an over current protection device (OCPD). MCAPs are charged by the battery charger and supply the electric power to subsystems connected the energy storage devices. OCPDs detect current from MCAPs to subsystems and protect subsystems from excessive currents of voltages.

6 Claims, 2 Drawing Sheets

ENERGY STORAGE SYSTEM

BACKGROUND

1. Field of Invention

The present invention relates to an energy storage system. More particularly, the present invention relates to an energy storage system with magnetic capacitors.

2. Description of Related Art

Most electronic systems are typically powered by chemical based batteries with a single power supply (single battery architecture). Newer "hybrid" architectures utilize a chemical based battery as the central power supply and ultra-capacitors/super-capacitors to supply peak power over a very short time duration (battery-ultracapacitor hybrid architecture). There are also battery based architectures that use multiple batteries (multiple batteries architecture).

However, many problems are associated with these architectures. In single battery architecture, the battery must be sized to support both peak power draw and continuous energy draw. As a result, the battery is often very bulky and not optimized for continuous operations. Large gauge wires are required to run between the battery and the high power draw subsystems, thus adding weight and bulk.

In a multiple batteries architecture, different batteries are sized to support different subsystem loads. While it improves the efficiency and redundancy over single battery architecture, it adds bulk and weight to the system. Complex circuitries are required to handle charge equalization among all batteries, so the performance of the multiple batteries system is not limited by the weakest battery. This problem is compounded by the use of batteries with different chemistries and charge/discharge profiles to better meet subsystem needs.

In the battery-ultracapacitor hybrid architecture, ultra-capacitors are used to handle only occasional peak loads. The battery is still the primary energy storage for the system. As a result, the system response and system weight are not greatly improved. Furthermore, complex circuitries are required to maintain charge equalization in the ultra-capacitor banks, adding the weight and power management overheads.

All of these architectures are limited by the power/energy/weight/size characteristics of batteries. For the foregoing reasons, there is a need to provide new energy storage architecture.

SUMMARY

The present invention is directed to an energy storage system for electrical systems using magnetic capacitors. The present invention provides a longer period of operation than traditional systems and reduces the weight and physical size of electronic systems.

To achieve the foregoing objectives, and in accordance with the purpose of the present invention as broadly described herein, the present invention provides an energy storage system that includes a battery charger and energy storage devices. The battery charger is connected to a DC/AC current source. The energy storage devices are coupled between the battery charger and subsystems respectively. Each of the energy storage devices includes a magnetic capacitor (MCAP) and an over current protection device (OCPD). The battery charger charges the MCAPs, and the MCAPs supplies electric power to subsystems connected the energy storage devices. OCPDs detect current from MCAPs to subsystems and protect subsystems from excessive currents of voltages.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
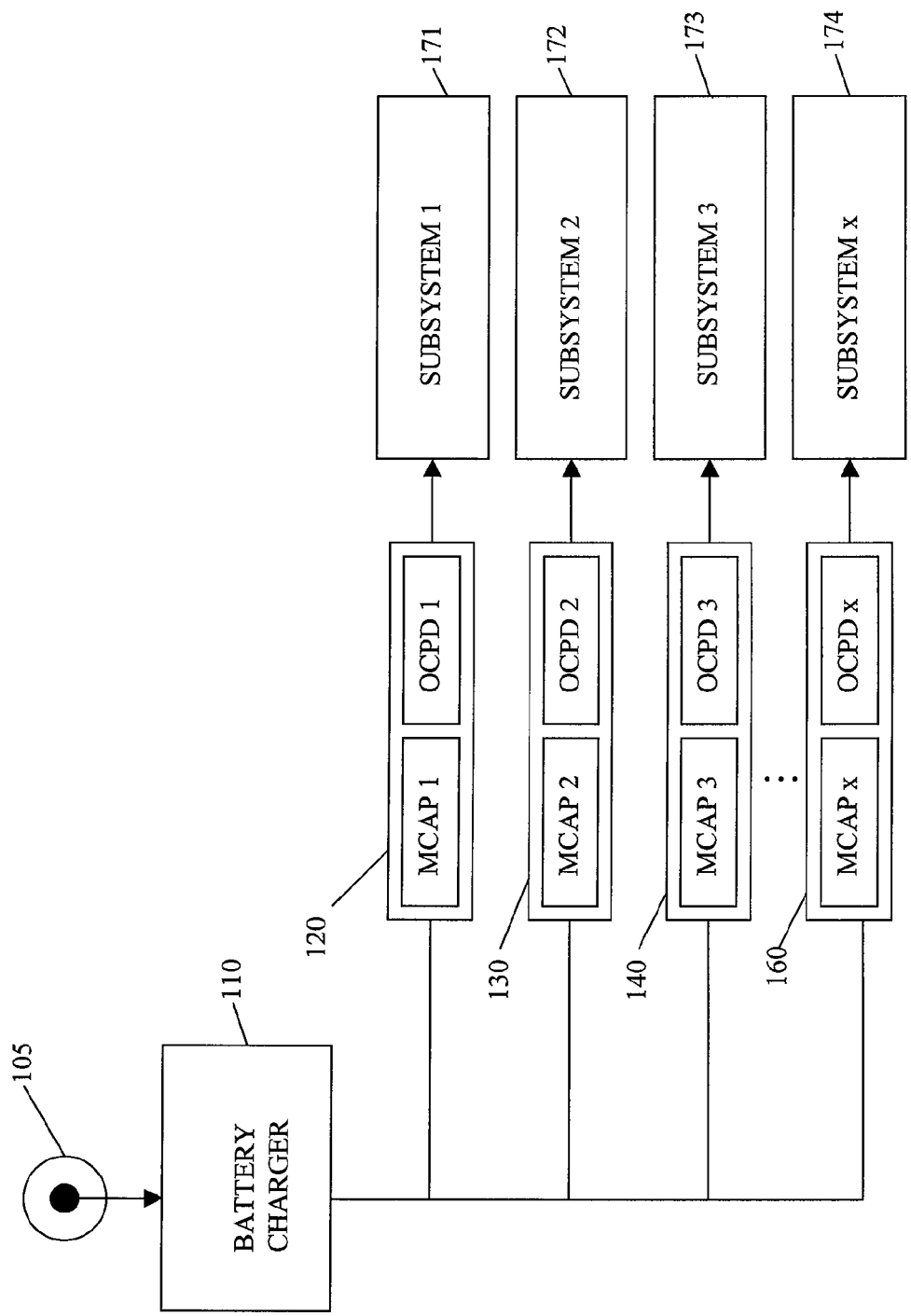
FIG. 1 is a block diagram of a distributed energy storage system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

All figures are drawn for ease of explanation of the basic teachings of the present invention only; the extensions of the figures with respect to number, position, relationship, and dimensions of the parts to form the embodiment will be explained or will be within the skill of the art after the following description has been read and understood.

FIG. 1 shows a block diagram of a distributed energy storage system according to one preferred embodiment of this invention. An energy storage system includes a battery charger 110 and a plurality of energy storage devices 120, 130, 140, and 160. The battery charger 110 is connected to a DC/AC current source 105. The energy storage devices 120, 130, 140, and 160 are coupled between the battery charger 110 and a plurality of subsystems 171, 172, 173, and 174 respectively. Each of the energy storage devices includes a magnetic capacitor (MCAP) and an over current protection device (OCPD). As shown in the figure, energy storage device 120 includes MCAP 1 and OCPD 1. A MCAP is charged by the battery charger and supplies the electric power to a subsystem connected an energy storage device. For example, subsystem 1 is connected with energy storage device 120, and MCAP 1 supplies the electric power to subsystem 1. According to different subsystem needs, MCAP 1, MCAP 2, MCAP 3 . . . MCAP x can have various energy storage capacities to meet the requirements. An OCPD detects current from a MCAP to a subsystem and protects the subsystem from excessive currents of voltages.

The MCAP plays different roles when the current supply sources are different. When the DC/AC current source supplies DC current, the MCAP is a battery. Otherwise, when the DC/AC current source supplies AC current, the MCAP is an ultra-capacitor.

Figure 2:
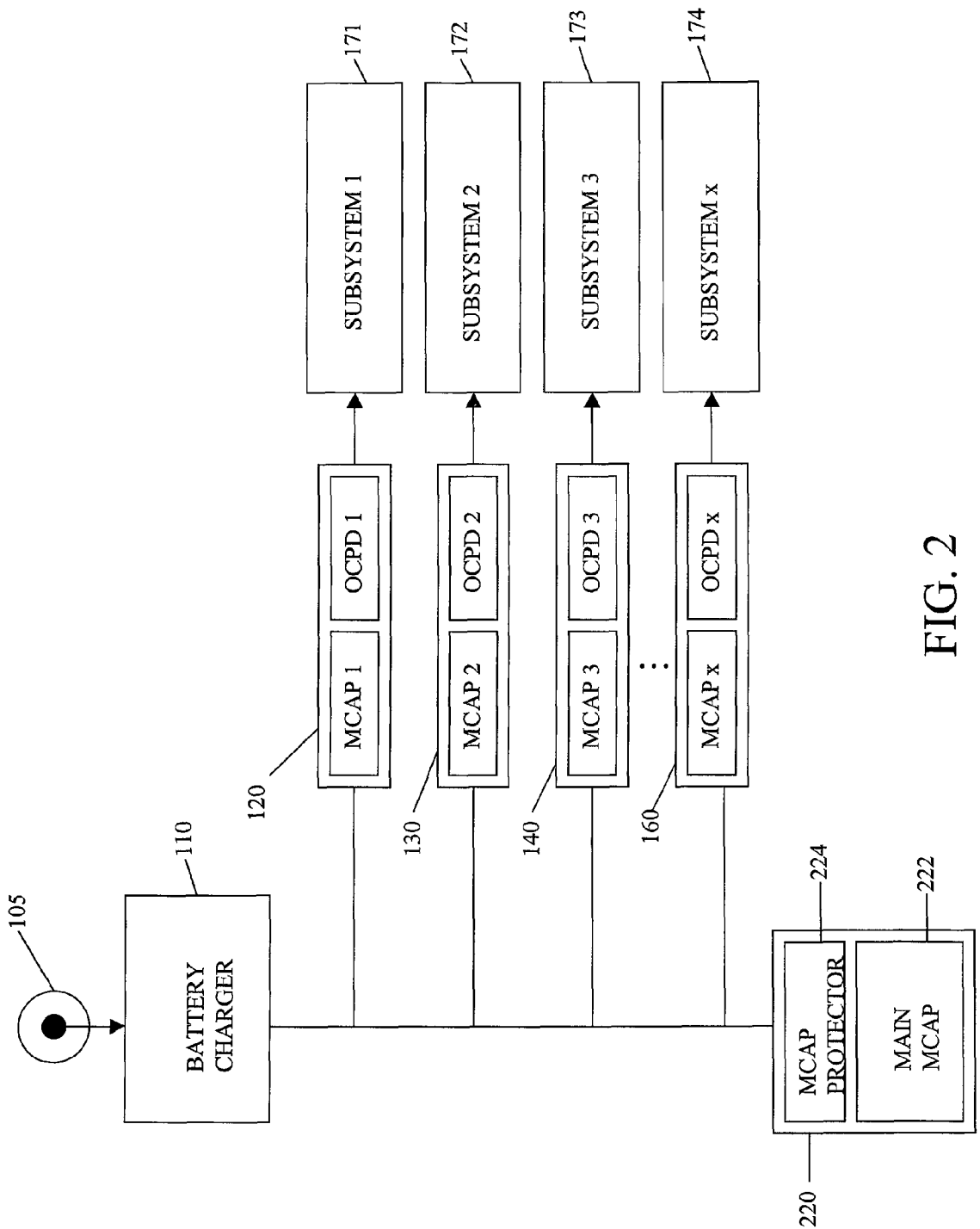
FIG. 2 is a block diagram of a distributed energy storage system according to another preferred embodiment of this invention.

FIG. 2 is a block diagram of a distributed energy storage system according to another preferred embodiment of this invention. The energy storage system in FIG. 2 is different from the energy storage system in FIG. 1 in that the energy storage system in FIG. 2 further includes an optional energy storage device 220 coupled to the battery charger 110. The optional energy storage device 220 includes a main magnetic capacitor 222 and a MCAP protector 224. The main magnetic capacitor 222 stores a higher amount of energy than other MCAPs to subsystems and can accommodate the overall electrical system needs accordingly. The MCAP protector 224 protects the MCAP from excessive currents of voltages.

In some embodiments, the energy storage device for each individual subsystem uses MCAP for energy storage; while in other embodiments, only some select subsystems uses MCAP for energy storage.

In some embodiments, MCAPs can be mounted on the subsystem printed circuit board (PCB), reducing labor cost and increasing production and quality rates. Because MCAPs are very small, this architecture does not lead to additional weight or size penalties. In other embodiments, MCAPs can be packaged in System-in-a-Package (SiP).

This invention utilizes the magnetic capacitor, which is an energy storage technology. This technology increases the energy storing capability more than 1 billion times compared with conventional capacitors, within the same volume and weight. Utilizing this technology rather than the standard used technology would bring much greater efficiency to this market.

As embodied and broadly described herein, the embodiments effectively provide an unlimited number of system recharge cycles without loss or degradation of performance. The embodiments also provide a longer period of operation than traditional systems. Besides, the embodiments reduce the weight and physical size of electronic systems.

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An energy storage system comprising:
   a battery charger connected to a current source; and
   a plurality of energy storage devices coupled between the battery charger and a plurality of subsystems respectively, each of the energy storage devices comprising:
   a magnetic capacitor (MCAP) which is charged by the battery charger and supplies the electric power to a subsystem connected to the energy storage device;
   an over current protection device (OCPD) detecting current from the MCAP to a subsystem and protecting the subsystem from excessive currents, wherein when the current source supplies AC current, the MCAP acts as an ultra-capacitor, when the current source supplies DC current, the MCAP acts as a battery;
   an optional energy storage device coupled to the battery charger, the optional energy storage device comprising a main magnetic capacitor and a main magnetic capacitor protector.

2. The energy storage system of claim 1, wherein the MCAP is mounted on the subsystem printed circuit board (PCB).

3. The energy storage system of claim 1, wherein the MCAP is packaged in System-in-a-Package (SiP).

4. An energy storage system comprising:
   a battery charger connected to a current source;
   a main energy storage device coupled to the battery charger, the main energy storage device comprising a main magnetic capacitor and a main magnetic capacitor protector; and
   a plurality of energy storage devices coupled between the battery charger and a plurality of subsystems respectively, each of the energy storage devices comprising:
   a magnetic capacitor (MCAP) which is charged by the battery charger and supplies the electric power to a subsystem connected to the energy storage device; and
   an over current protection device (OCPD) detecting current from the MCAP to a subsystem and protecting the subsystem from excessive currents, wherein when the current source supplies AC current, the MCAP acts as an ultra-capacitor, when the current source supplies DC current, the MCAP acts as a battery.

5. The energy storage system of claim 4, wherein the MCAP is mounted on the subsystem printed circuit board (PCB).

6. The energy storage system of claim 4, wherein the MCAP is packaged in System-in-a-Package (SiP).

\* \* \* \* \*